United States Patent [19]

Lee

[11] Patent Number: 4,685,627

[45] Date of Patent: Aug. 11, 1987

[54] PLURAL-SEASONING DISTRIBUTOR

[76] Inventor: Ching-Chang Lee, P.O. Box 70-217, Taipei, Taiwan

[21] Appl. No.: 826,780

[22] Filed: Feb. 6, 1986

[51] Int. Cl.⁴ ............................................. B02C 19/08
[52] U.S. Cl. ............................... 241/169.1; 241/261.1
[58] Field of Search ................ 241/169, 169.1, 257 R, 241/260, 261, 261.1, 160, 162

[56] References Cited

U.S. PATENT DOCUMENTS 210,837 12/1878 Chalas ............................... 241/169.1

Primary Examiner—Timothy V. Eley

[57] ABSTRACT

A plural-seasoning distributor includes an inner bottle filled with seasoning powder, and outer bottle filled with seasoning particulates, and a grinder having grinding stator fixed under the outer bottle and a grinding rotor formed by superimposing a plurality of grinding discs on the lower portion of the inner bottle, whereby upon the rotation of an upper cover engaged on the bottles, the inner bottle and the grinding rotor will be rotated to grind the particulates discharged from the outer bottle with respect to the grinding stator, and upon the depression of a button formed on the top end of a guiding rod jacketed within the inner bottle, the powder will be discharged from the lower tunnel of the inner bottle which is normally sealed by a plug formed on the lower end of the guiding rod.

12 Claims, 6 Drawing Figures

PLURAL-SEASONING DISTRIBUTOR

BACKGROUND OF THE INVENTION

Conventional seasoning containers are designed for single purpose use such as a salt shaker or pepper shaker. When different kinds of seasonings are required several bottles must be respectively provided occupying much space and increasing the cost.

Conventional pepper grinder as shown in FIGS. 1 and 2 comprises a central rod C, a single piece cone-shape grinding rotor formed on the lower portion of the rod C with several larger spiral teeth B1 and several smaller spiral teeth B2, and a grinding stator A formed on the lower portion of the container with ratchet teeth A1 on a stator surface and a trumpet-shape ratchet teeth surface A2 on the lower perimeter of the stator surface, whereby pepper particulates can be ground by rotating the grinding rotor within the grinding stator. However, when such a pepper grinder is damaged, the whole rotor has to be replaced.

SUMMARY OF THE INVENTION

The object of the present invention is to provide a plural-seasoning distributor including an inner seasoning bottle for agitating and quantitatively supplying a seasoning powder like table salt from the inner bottle and an outer bottle having a grinder formed on its bottom portion to grind another seasoning particulate like pepper contained in the outer bottle.

Another object of the present invention is to provide a grinder having a grinding rotor formed by superimposing a plurality of grinding discs each having several arcuated extensions on the disc perimeter for easier replacement of the broken grinding disc.

DETAILED DESCRIPTION

Figure 1:
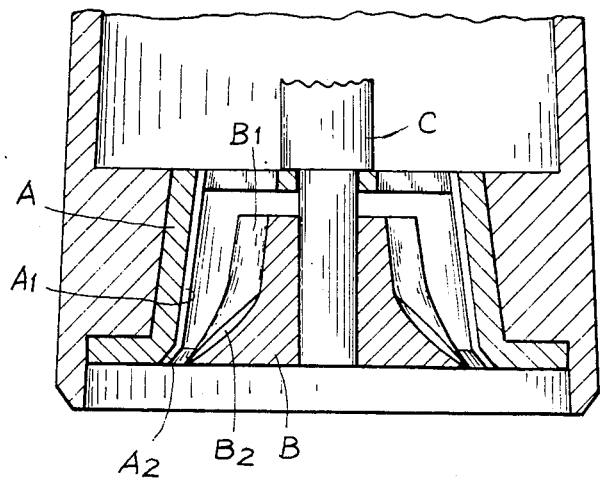
FIG. 1 is a sectional drawing of a conventional pepper grinder.
Figure 2:
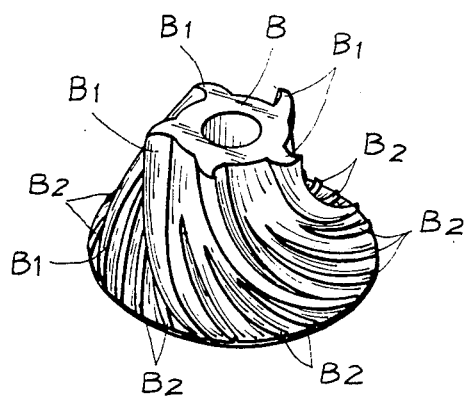
FIG. 2 is a perspective illustration of a conventional grinding rotor.

As shown in FIGS. 3-6, the present invention comprises: an outer bottle 1, a coupling collar 2, an inner bottle 3, an upper cover 4, a jacket tube 5, a button 6, a push rod 7 and a grinder 8, formed on the lower portion of the outer bottle 1.

The outer bottle 1 is fixed with a bottom collar 11 having a central hole 12 on its lower portion above the bottom edge 14 and is formed with an open upper edge 13.

The coupling collar 2 includes a supporting disc 21 having a central hole 22 for rotatably mounting the inner bottle 3, a cylindrical wall 25 surrounding the disc 21, an annular groove 24 formed in the cylindrical wall 25 to engage with the upper edge 13 of outer bottle 1 and a ring groove 23 disposed on the inside wall of cylindrical wall 25.

The inner bottle 3 includes a coupling head 31 which is formed with several side extensions 32 on its perimeter and formed with a socket 33 on its central portion, a funnel formation 34 at the lower portion of the bottle 3, an end portion of generally annular cross section, whose inner wall 35 is preferably square. The funnel formation 34 and the region lying within the inner wall 35 define a central discharge tunnel 36 and the externally threaded male-threaded portion 37. The bottom edge 38 of the bottle 3 is slightly higher than the bottom edge 14 of outer bottle 1.

The upper cover 4 is formed with a hollow portion 41 and a stop plate 42 which is drilled with a central hole 43 for movably inserting a plunger 61 of a button 6. An annular ring 44 is formed on the lowest perimeter of upper cover 4. Several grooves 45 are formed inside the annular ring 44 to engage with the side extensions 32 of inner bottle 3. Several tenons 46 are formed outside the ring 44 to engage with the ring groove 23 of collar 2 so that the upper cover 4 can be rotated to simultaneously rotate the inner bottle 3.

The jacket tube 5 is formed with bottom disc 51 mounted in the socket 33 and an upper edge 52 limited by the top plate 42 of upper cover 4. The tube 5 is made with a hollow portion 53 for jacketing a push rod 7 which passes through a central hole 54 formed on the disc 51.

The push rod 7, extending in the jacket tube 5 and inner bottle 3, includes an upper threaded portion 71 to engage with an internally threaded hole 63 of button 6 for connecting to the button 6. The button 6 is formed with a bottom plate 62 normally biased upward by a restoring spring 64 sleeved on the rod 7 above the disc 51. A limiting plate 72 is positioned on the rod 7 beneath the disc 51. The bottom of the rod 7 forms a first tapered plug 73 having a flat bottom and an internally threaded screw hole 74. An agitator 75 is formed on the lower portion of rod 7 just above the plug 74. A second tapered plug 76 is coupled to the first plug 73 by means of an externally threaded end portion 78 which screws into the internally threaded hole 74 of the first plug. The second plug 76 has a flat bottom, a tapered neck 77, and a slot 79 formed in the bottom for driver action. The distance between the first and second plugs may accordingly be adjustable varied. As a result, a chamber 79a is adjustably defined between the flat bottom of first plug 73 and the tapered portion 77 of the second plug 76. The volume chamber 79a can accordingly be adjusted to vary the amount of seasoning confined therein prior to discharge via the pushing of button 6. Upon depression of button 6, the seasoning powder filled in the chamber 79a can be discharged through the tunnel 36. By reciprocatively moving the agitator 75, the powder will be agitated homogeneously for its smooth distribution.

The grinder 8 includes a grinding stator 81 and a grinding rotor 82. The grinding stator 81 includes a flange 83 fixed on the bottom collar 11 of outer bottle 1, an upper plate 84 having several openings 84a for discharging the seasoning particulates and a central tapered hole 85 for rotatably engaging the funnel 34 of inner bottle 3, a cone-shaped gear-toothed surface 86 formed on the inside wall of stator 81 and a trumpet-shaped internal-toothed surface 87 formed on the lower perimeter of the stator 81.

Figures 3, 4, 5, 6:
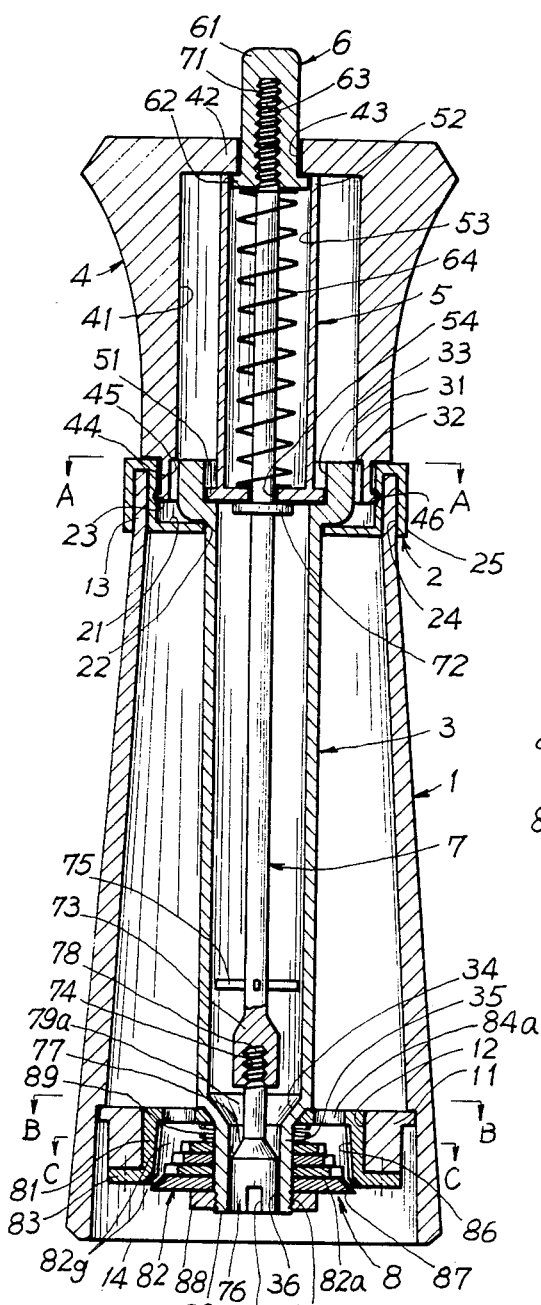
FIG. 3 is a sectional drawing of the present invention.
FIG. 4 is a cross-sectional drawing of the present invention as viewed from AA direction of FIG. 3.
FIG. 5 is a cross-sectional drawing of the present invention as viewed from BB direction of FIG. 3.
FIG. 6 is a cross-sectional drawing of the present invention as viewed from cc direction of FIG. 3.

The grinding rotor 82 includes a plurality of grinding discs 82a having different diameters and each having an equal number of arcute extensions 82b protruding from the perimeter of each disc 82a, and a bottom disc 82d having a bevel-gear-toothed surface 82c corresponding to the trumpet-shaped internal toothed surface 87 of grinding stator 81. The grinding discs 82a are superimposed to form a cone-shaped grinding rotor wherein each arcuat extension 82b is formed with a gear-toothed surface 82e along its arcuat edge and each extension 82b is deviates from the lower extension 82b of the lower disc 82a superimposed thereunder with a small angle θ as shown in FIG. 6 so that several spirally stepped blades 82g is formed corresponding to the gear-toothed surface 86. When the particulates return are discharged through the openings 84a and ground by rotating the rotor 82 (direction R) with respect to the stator 81, they are distributed as powder through the aperture between disc 82d and the trumpet shaped toothed surface 87 for use. All discs 82a and disc 82d are each formed with a central square hole 82f so that all discs can be mounted for responsive rotation about the square inner wall 35 by fixing a nut 88 on the threaded portion 37. Between the uppermost disc 82a and upper plate 84, there is provided with a retainer spring 89 for sturdy fixation of all discs 82a, 82d on the shaft 35.

Whenever damage or breakage caused to any grinding disc 82a, the broken disc can be replaced with new one without disposal of the complete rotor set 82 to save cost and to simplify the maintenance of this instrument. Meanwhile, the plate-type disc 82a can be easily fabricated by mass production to save production cost.

I claim:

1. A seasoning distributor comprising:
   an outer container for containing seasoning particulates and having open top and bottom ends;
   an inner container for containing a seasoning powder and mounted for rotation within the outer container, the inner container extending axially within the outer container and terminating in an open bottom end;
   means for mounting the inner container for rotation within the outer container;
   an upper cover mounted for rotation on the outer container;
   means responsive to the rotation of the upper cover to rotate the inner container within the outer container;
   a rod extending through the inner container and including at its bottom end a first plug positioned above the bottom opening of the inner container and sized to block said opening;
   a second plug depending from the first plug, and coupled thereto at an axially spaced distance therefrom, the second plug being sized to block the bottom opening of the inner container;
   biasing means operable on the rod to urge the second plug into blocking engagement with the opening of the inner container;
   manually operable actuating means for moving said rod in opposition to the biasing means from a first position in which the second plug blocks the discharge opening of the inner container, to a second position wherein the second plug moves away from the discharge opening to permit discharge of seasoning powder and the first plug moves into blocking engagement with the discharge opening to limit the powder discharged to the seasoning;
   a grinding stator positioned within the discharge opening of the outer container and having radially inwardly projecting tooth surfaces;
   a grinding rotor assembly mounted for rotation with the inner container and including a plurality of grinding discs of respectively different diameters adjacently superimposed one above the other,
   each of said discs having a number of arcuate extensions protruding from its perimeter, said extensions having a toothed edge progressively deviating at a small angle from the corresponding edges of the other discs, the toothed edges cooperating with the tooth surface of the stator to crush the seasoning particulate as the rotor assembly rotates with the inner bottle in response to rotation of the cover.

2. The seasoning distributor of claim 1 wherein the inner tooth surface of the stator has a trumpet-shaped bottom end portion; and the distributor further includes a bottom disc beneath the grinding discs and mounted for rotation therewith, the bottom disc having a bevel gear toothed surface cooperating with the trumpet-shaped portion of the stator to grind the seasoning exiting from the outer bottle.

3. The seasoning distributor of claim 1 including means for adjusting the axial spacing between the first and second plugs.

4. The seasoning distributor of claim 3 wherein the adjusting means includes a generally axially extending screw thread formed on one of the two plugs and sized to mate with a generally axially extending internally threaded hole formed in the other of the two plugs, the bottom-most plug including a slot formed on its bottom-most surface for engaging a driver whereby the bottom-most plug can be rotated to adjust the axial space between the plugs.

5. The seasoning distributor of claim 1 wherein the bottom portion of the inner container has a non-circular cross section, the rotor discs each include a generally central through-hole sized to mount on the non-circular bottom portion of the inner container for responsive rotation, and the discs are so mounted on the inner container for responsive rotation.

6. The seasoning distributor of claim 1 including collar means having a generally central through-hole and positioned within the upper portion of the outer container, the inner container extending upward through the through-hole,
   the collar means further including means for guiding the rotational movement of the upper cover,
   the cover engaging the portion of the inner container above the collar means for responsive rotation thereby.

7. A seasoning distributor comprising:
   an outer container for containing seasoning particulates having an open top with an upper edge and an open bottom with bottom collar means provided thereat for supporting a grinding stator across the bottom opening of the outer container;
   coupling collar means mounted adjacent said upper edge;
   an inner container for containing seasoning powder generally centered in said outer container and having a coupling head rotatably mounted on said coupling collar means, said inner container extending axially toward said bottom of said outer container and having a funnel formation and a rotor-mounting tubular end portion of non-circular cross-section near said bottom;
   an upper cover rotatably mounted on said coupling collar means and coupled to said coupling head for simultaneous rotation with said inner container;

push rod means extending within said upper cover and through said inner container, the push rod means terminating in a first plug and a second plug which are axially spaced apart in said funnel formation and said rotor mounting hollow end portion, said push rod means being movable between a first position in which said second plug blocks said hollow end portion, and a second position in which said second plug extends outwardly of said tubular end portion to discharge the seasoning powder and said first plug blocks the hollow end portion to stop the seasoning powder;

a push button attached to the top end of said push rod means and protruding outwardly from said upper cover;

grinding stator means circumventing said rotor-mounting hollow end portion and supported by said bottom collar means, the stator means having an inner toothed surface which has a trumpet-shaped toothed bottom end portion; and a grinding rotor mounted on said rotor-mounting hollow end portion, and including a plurality of grinding discs with different diameters superimposed one above the other and each having an equal number of arcuate extensions protruding from the perimeter of each grinding disc, each of said arcuate extensions having a gear-toothed edge progressively deviating at a small angle from said arcuate extension of the other said grinding disc adjacent thereto, and a bottom disc beneath said grinding discs having a bevel-gear-toothed surface corresponding to said trumpet-shaped toothed end portion.

8. A seasoning distributor as claimed in claim 7, wherein said push rod means further includes an agitating rod attached transversely to said push rod above said first plug.

9. A seasoning distributor as claimed in claim 7, wherein said push rod means includes an upper section with a bottom end incorporating said first plug, and a lower section connected telescopically to said upper section and incorporating said second plug at its bottom, whereby the distance between said first and second tapered plugs can be adjusted to define an adjustable chamber in said funnel formation to vary the amount of the seasoning powder confined therein.

10. A seasoning distributor as claimed in claim 9, wherein said first plug has an axial bore opening at its bottom, and said lower section is inserted threadedly in said axial bore.

11. A seasoning distributor as claimed in claim 7, further including spring means provided in said upper cover said jacket tube for normally biassing said push rod means toward said first position.

12. A seasoning distributor as claimed in claim 7, wherein at least one of the plugs is tapered.

* * * * *